US012227012B2

(12) United States Patent
Murayama et al.

(10) Patent No.: US 12,227,012 B2
(45) Date of Patent: Feb. 18, 2025

(54) INKJET PRINTING APPARATUS AND CONTROL METHOD

(71) Applicant: CANON KABUSHIKI KAISHA, Tokyo (JP)

(72) Inventors: Yoshiaki Murayama, Tokyo (JP); Sonoko Egawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 18/058,176

(22) Filed: Nov. 22, 2022

(65) Prior Publication Data

US 2023/0166522 A1 Jun. 1, 2023

(30) Foreign Application Priority Data

Nov. 26, 2021 (JP) ................................ 2021-192449
Oct. 17, 2022 (JP) ................................ 2022-166368

(51) Int. Cl.
*B41J 2/175* (2006.01)
*B41J 29/393* (2006.01)

(52) U.S. Cl.
CPC ......... *B41J 2/17566* (2013.01); *B41J 29/393* (2013.01); *B41J 2002/17589* (2013.01)

(58) Field of Classification Search
CPC .................. B41J 2/17566; B41J 29/393; B41J 2002/17589; B41J 29/38
See application file for complete search history.

(56) References Cited

U.S. PATENT DOCUMENTS

2021/0031547 A1* 2/2021 Kato .................... B41J 2/16532

FOREIGN PATENT DOCUMENTS

JP 2002-178533 A 6/2002

* cited by examiner

*Primary Examiner* — Lisa Solomon
(74) *Attorney, Agent, or Firm* — Canon U.S.A., Inc. I.P. Division

(57) ABSTRACT

An inkjet printing apparatus includes a print head including a plurality of nozzles, a cap, and a storing unit, and a control unit. The control unit controls the print head to start and perform an intra-standby preliminary discharge operation where a preliminary discharge operation to discharge ink into a cap is performed at predetermined time intervals during a standby period after the print head finishes a printing operation to print an image, continue the intra-standby preliminary discharge operation if an accumulated value of an amount of ink stored in a storing unit during the preliminary discharge operation is not greater than a threshold value, stop the intra-standby preliminary discharge operation if the stored accumulated value of the amount of ink is greater than the threshold value, and bring the print head into contact with the cap and terminating the standby period if the standby period exceeds a predetermined time period.

14 Claims, 16 Drawing Sheets

INKJET PRINTING APPARATUS AND CONTROL METHOD

BACKGROUND

Field

The present disclosure relates to an inkjet printing apparatus and a control method.

Description of the Related Art

Inkjet printing apparatuses that print an image by applying ink onto a print medium have been developed. In inkjet printing apparatuses, while an image is not being printed, water in ink may evaporate from nozzles (discharge ports) that discharge the ink and, thus, the ink may thicken, resulting in the defective discharge of the ink from the nozzles. To prevent defective discharge, so-called preliminary discharge is performed to discharge ink that has thickened in the nozzles toward a cap.

To reduce the amount of ink of preliminary discharge performed during standby (while an image is not being printed), Japanese Patent Laid-Open No. 2002-178533 describes that the environment temperature is monitored, and the timing and the amount of preliminary discharge ink can be varied in accordance with the environment temperature.

SUMMARY

According to an aspect of the present disclosure, an inkjet printing apparatus includes a print head including a plurality of nozzles, each configured to discharge ink onto a print medium, a cap configured to receive ink discharged from the print head during a preliminary discharge operation, a storing unit configured to store a value corresponding to an amount of ink discharged to the cap during the preliminary discharge operation, and a control unit configured to control the print head to start an intra-standby preliminary discharge operation in which the preliminary discharge operation is performed at predetermined time intervals during a standby period after the print head finishes a printing operation to print an image, continue the intra-standby preliminary discharge operation if an accumulated value of the amount of ink stored in the storing unit is not greater than a threshold value, stop the intra-standby preliminary discharge operation if the stored accumulated value of the amount of ink is greater than the threshold value, and bring the print head into contact with the cap and terminate the standby period if the standby period exceeds a first predetermined time period.

Further features of the present disclosure will become apparent from the following description of exemplary embodiments with reference to the attached drawings.

DESCRIPTION OF THE EMBODIMENTS

First Embodiment

An exemplary embodiment of the present disclosure is described below with reference to the accompanying drawings.

Figure 1:
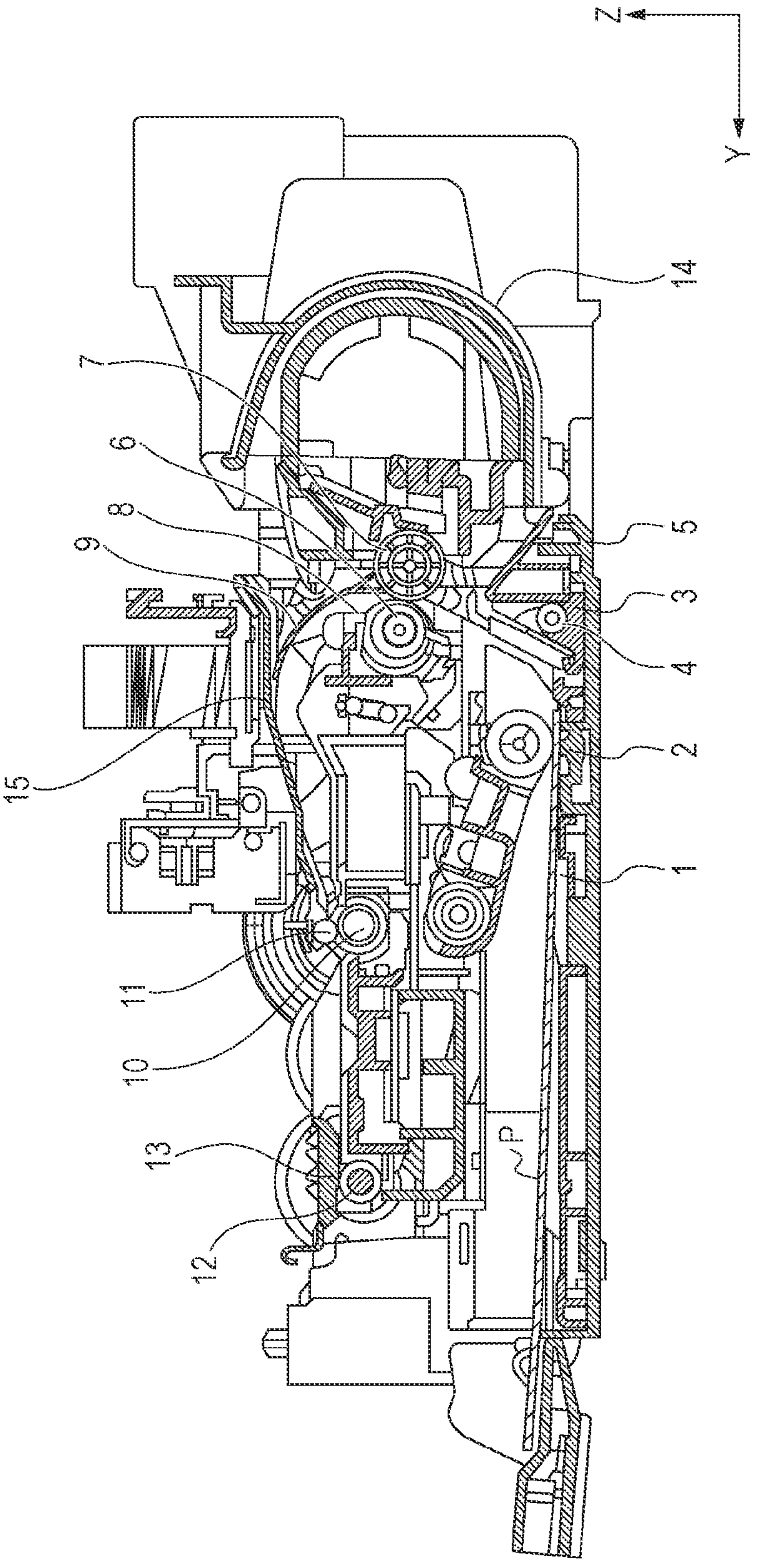
FIG. 1 is a vertical sectional view of a printing apparatus according to a first embodiment.
Figure 2:
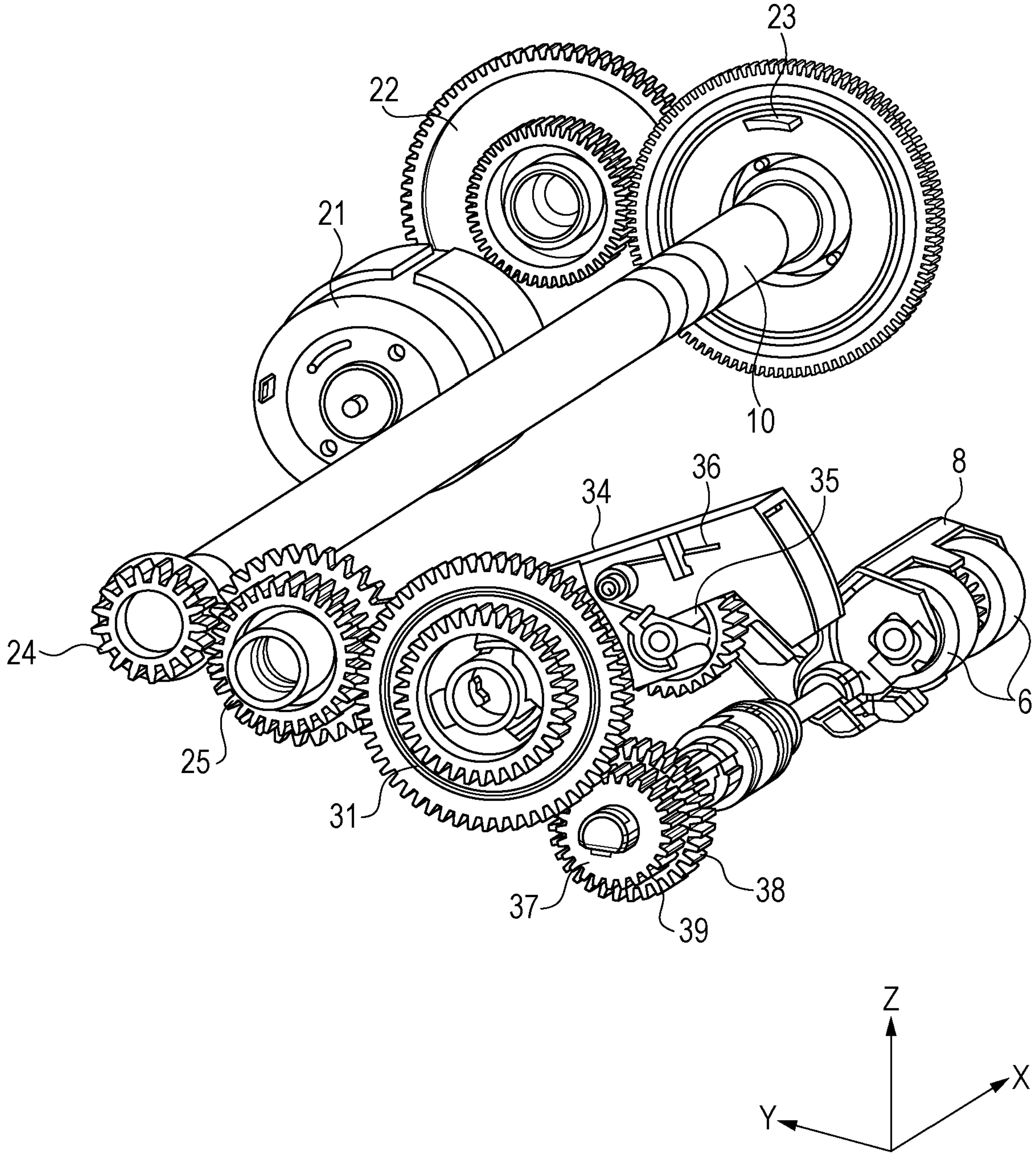
FIG. 2 is a perspective view of a driving mechanism of the printing apparatus illustrated in FIG. 1.

FIG. 1 is a cross-sectional view of the entire inkjet printing apparatus according to the present embodiment. Upon receiving a print command sent from a host apparatus, such as a personal computer (PC), a control unit drives a motor 21 that serves as a drive source for each of mechanisms of the printing apparatus. The motor 21 is illustrated in FIG. 2 (described below). The motor 21 drives a sheet feed mechanism 2, an intermediate roller 6, a conveyance roller 10 disposed downstream of the intermediate roller 6, and a sheet discharging roller 12 disposed downstream of the conveyance roller 10.

The sheet feed mechanism 2 conveys print media P stacked on the paper feed tray 1 so as to push out the print media P, brings the print media P into contact with a separating member 4, and separates the print media P one by one. The separated print medium P is conveyed by the sheet feed mechanism 2 to the intermediate roller 6 and its paired pinch roller 7. When the leading edge of the print medium P passes through the intermediate roller 6, the leading edge collides with the circumference of a U-turned paper guide, and the conveyance direction is reversed while following the paper guide. Then, the leading edge reaches the conveyance roller 10 and its paired pinch roller 11. When the leading edge of the print medium P reaches a nip portion of the conveyance roller 10, the position of the leading edge is adjusted in accordance with the type of print medium, and the skew of the print medium is corrected. This leading edge position adjustment is also referred to as "leading edge registration". When the leading edge registration is performed, the conveyance roller 10 can be driven by the motor 21 so as to also rotate in a direction in which the print medium P is returned, that is, in the direction opposite to the conveyance direction. In contrast, the intermediate roller 6 is configured to always rotate in a forward conveyance direction, that is, in a direction in which the print medium P is discharged, regardless of which direction the motor 21 drives. This two-roller configuration can form a loop of the print medium in front of the conveyance roller 10. When the print medium P reaches the conveyance roller 10, the motor 21 reverses its driving direction so as to temporarily rotate the conveyance roller 10 in the direction in which the print medium P is rewound. Thereafter, the conveyance roller 10 is rotated again in the forward direction to convey the print medium P in which the print medium P is discharged. In this manner, the leading edge registration is completed. After the leading edge registration is performed, the print medium P is conveyed onto a platen, and the sheet feeding operation is completed.

A printing unit 714 (refer to FIG. 7) that scans in a direction intersecting the direction in which the print medium P is conveyed is disposed above the platen. The printing apparatus according to the present embodiment is a so-called serial type printing apparatus in which the printing unit 714 scans in a scanning direction (the X direction in FIGS. 1 to 6) that intersects the conveyance direction (the Y direction in FIGS. 1 to 6). During the scanning, ink droplets are discharged from the nozzles (the discharge ports) of a print head 717 (refer to FIG. 7) mounted in a printing unit 714 onto the print medium P conveyed onto the platen, and an image is printed on the print medium P.

Figure 13A:
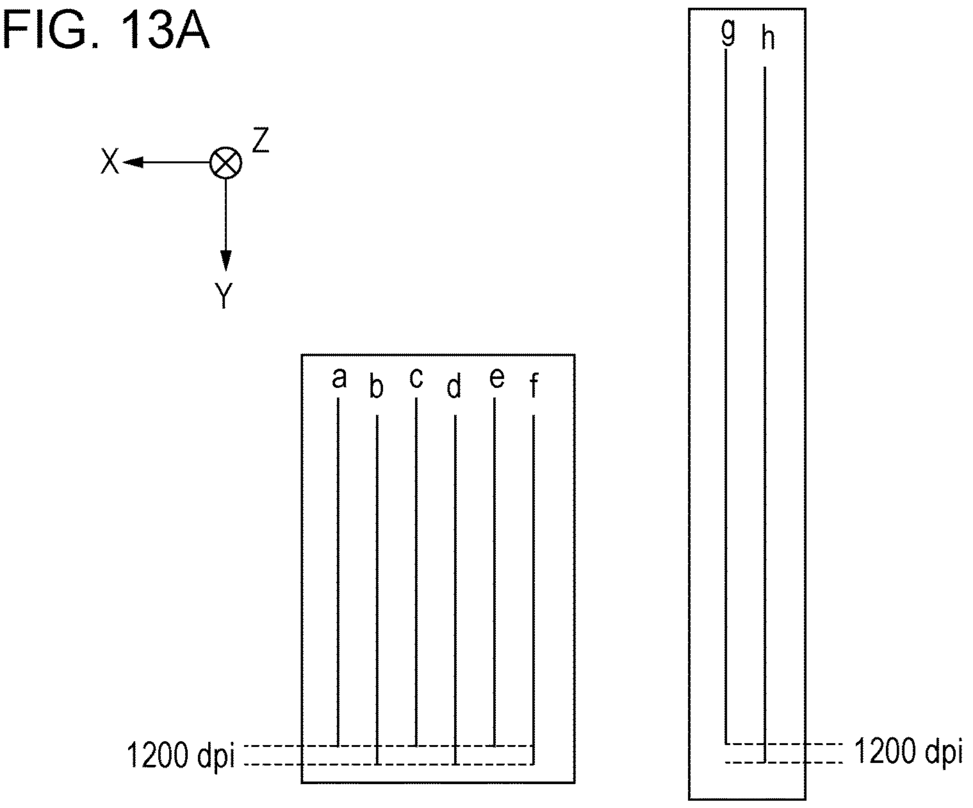
FIG. 13A illustrates the configuration of a print head.
Figure 13B:
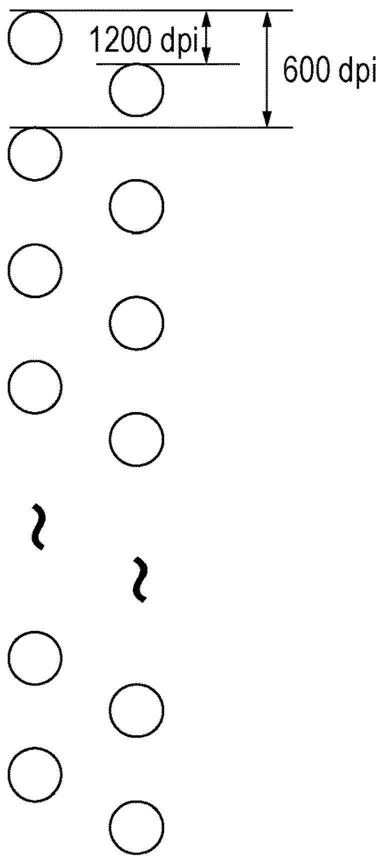
FIG. 13B illustrates the configuration of a print head.

FIGS. 13A and 13B are schematic illustrations of the print head 717. FIG. 13A is a conceptual diagram of a nozzle surface (a discharge port surface) on which a nozzle array including a plurality of nozzles (discharge ports) for discharging ink is disposed. FIG. 13B illustrates the nozzle arrangement in each of nozzle rows. In each of the nozzle row, nozzles are arranged at intervals of 600 dpi in the Y direction in FIGS. 13A and 13B. Two nozzle rows for each ink color are arranged in a staggered pattern with a shift of 1200 dpi in the Y direction. That is, the printing resolution in the Y direction for each ink color is 1200 dpi.

The print head 717 includes an ink flow passage (not illustrated) for supplying ink to the nozzles. In addition, each of the nozzles includes a print element that generates energy for discharging ink in the form of droplets. According to the present embodiment, an electrothermal transducer element that converts electric energy into heat energy is used as the print element. However, the print element is not limited thereto, and may be a piezo element.

In FIG. 13A, rows a and b are nozzle rows arranged to discharge cyan ink, rows c and d are nozzle rows arranged to discharge magenta ink, and rows e and f are nozzle rows arranged to discharge yellow ink. Similarly, rows g and h are nozzle rows to discharge black ink. Each of the nozzle rows for cyan, magenta, or yellow color ink has 256 nozzles arranged therein, and the nozzle row for black ink has 640 nozzles arranged therein.

A printing operation to print an image is performed by repeating the conveyance by the conveyance roller 10 described above and the print scan by the printing unit 714. According to the present embodiment, a method known as multipass printing method is employed in which a plurality of scans are performed on a unit area of the print medium to complete printing of an image on the unit area. A print scan by the printing unit 714 is also referred to as a "pass", and the number of times the print head 717 scans to complete printing on a predetermined unit area is referred to as the "number of passes". When the printing of an image is completed, the print medium P is conveyed in the forward conveyance direction by a pair consisting of the sheet discharging roller 12 and a spur 13 and is discharged.

FIG. 2 is a perspective view of a driving mechanism of the inkjet printing apparatus according to the present embodiment. More specifically, FIG. 2 illustrates the details of the drive transmission mechanism that transmits the drive force of the motor 21 to the conveyance roller 10 and the intermediate roller 6. According to the present embodiment, both the conveyance roller 10 and the intermediate roller 6 are commonly driven by the motor 21. This enables reduction in the size and cost of the printing apparatus body.

A gear (not illustrated) attached to the rotating shaft of the motor is connected via an idler gear 22 to a conveyance input gear 23 attached to one end of a shaft of the conveyance roller 10. A code wheel (not illustrated) with markings is attached to the conveyance input gear 23, and the rotation amount of the motor can be detected. By reading the code wheel with an encoder sensor (not illustrated), the rotation amount of the conveyance roller 10 can be controlled. A conveyance output gear 24 is attached to the other end of the shaft of the conveyance roller 10. The drive force is transmitted from the conveyance output gear 24 to a sun gear 31 via an idler gear 25. The sun gear 31 is configured as a clutch gear.

Figure 3:
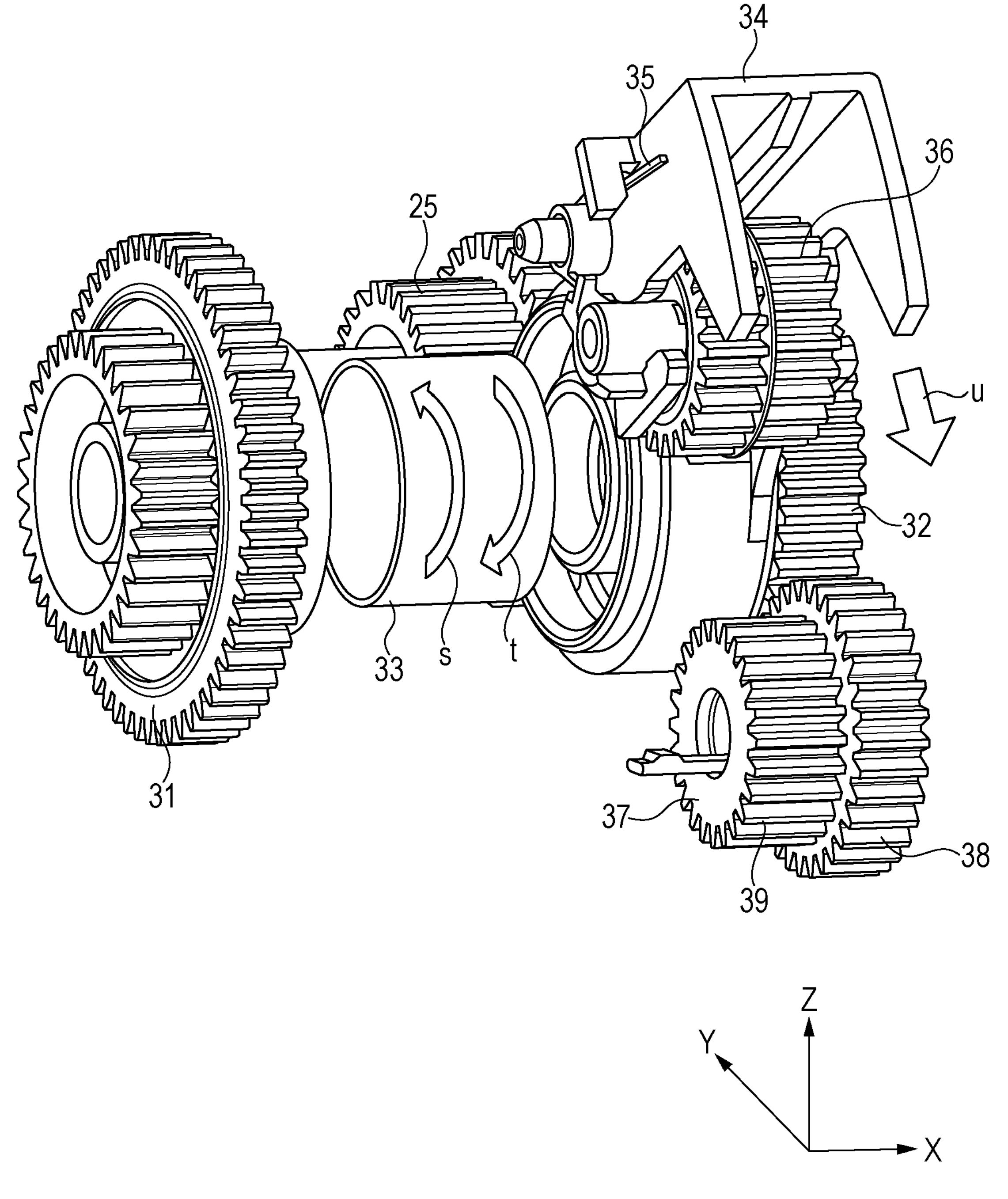
FIG. 3 is a perspective view of the configuration of a clutch gear illustrated in FIG. 2.

FIG. 3 is a perspective view of the configuration of the clutch gear illustrated in FIG. 2. As illustrated in FIG. 3, a spring 33 is provided inside the sun gear 31, and the forward rotation of the sun gear 31 tightens the spring 33, enabling the sun gears 31 and 32 to rotate together. In contrast, the reverse rotation of the sun gear 31 opens the spring 33. Therefore, when a load is applied to the sun gear 32, the sun gear 31 and the sun gear 32 slip from each other and cannot rotate together. A swing arm 34 is provided on the shaft of the sun gear 31, and a planet gear 35 is attached onto a swing arm 34. A swing arm spring 36 is provided between the planet gear 35 and the swing arm 34 so that when the sun gear 31 rotates, the swing arm 34 also rotates together due to friction. A step 38 of a multi-step gear 37 is meshed with the sun gear 32. In addition, a step 39 of the multi-step gear 37 is attached at a position where the step 39 can be meshed with the planet gear 35.

Due to the configuration, when the sun gear 31 rotates in the forward direction (the direction of arrow s), the drive force input to the sun gear 31 is transmitted to the step 38 of the multi-step gear 37 by the sun gear 32 that rotates together with the sun gear 31. In contrast, when the sun gear 31 rotates in the reverse direction (the direction of arrow t), the swing arm 34 moves in the direction of arrow u in FIG. 3, the planet gear 35 and the step 39 of the multi-step gear 37 are meshed, and the drive force is transmitted to the multi-step gear 37. Since the sun gear 32 is a clutch gear, the sun gear easily slips during reverse rotation and does not interfere with driving. Due to the transmission method, the direction of rotation of the multi-step gear 37 is the same regardless of whether the sun gear 31 rotates in the forward or reverse direction.

Figure 4:
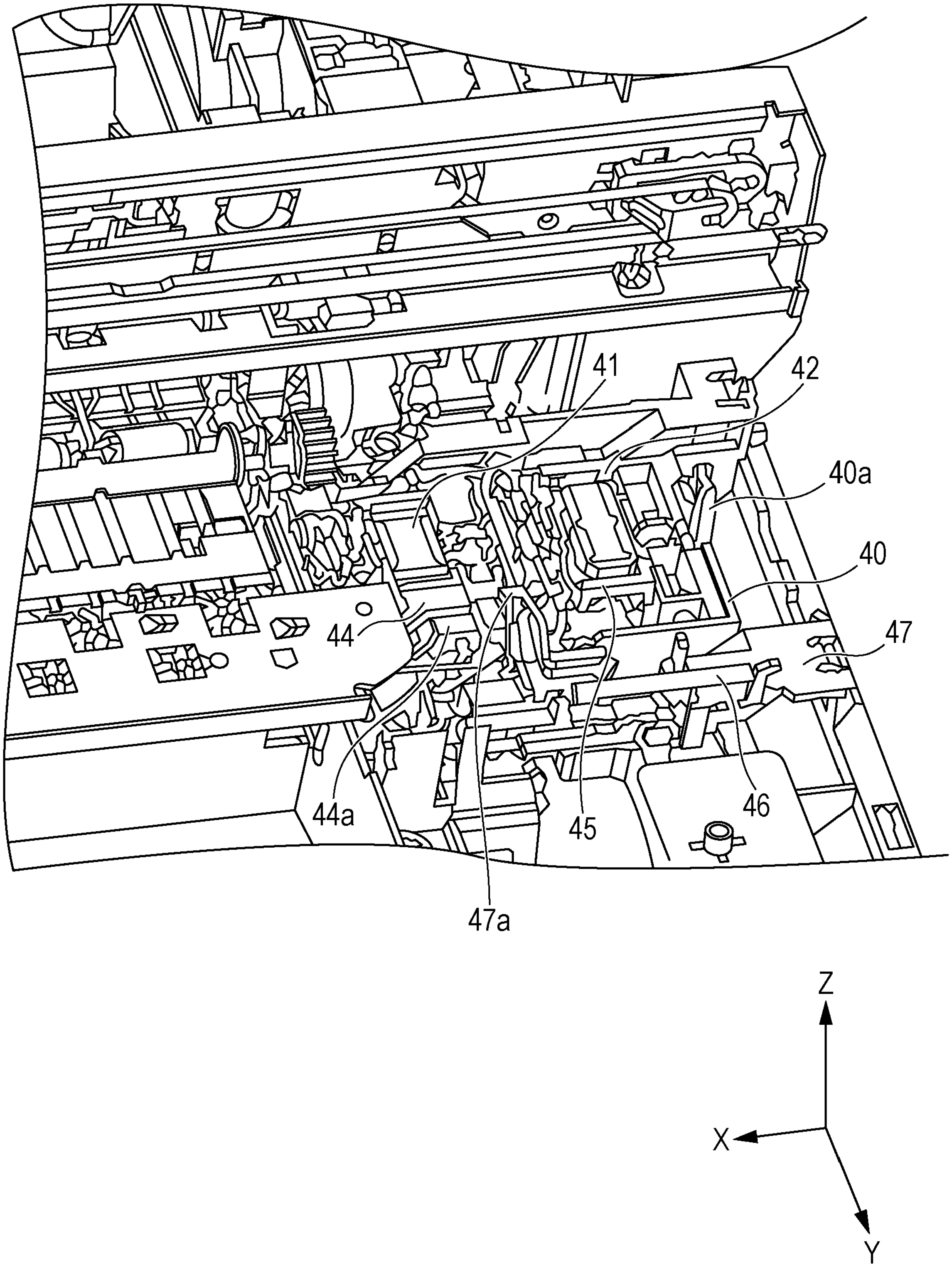
FIG. 4 is a perspective view of a recovery mechanism of the printing apparatus illustrated in FIG. 1.

FIG. 4 is a perspective view of a recovery mechanism. The recovery mechanism 715 of the present embodiment is used to ensure the ink discharge performance of the print head 717. In FIG. 4, a slider 40 follows the movement of the print head 717 in the reciprocating direction and can slide in an area outside the print area in which the image is printed. In addition, the slider 40 is movable in a direction perpendicular to the color ink discharge port surface and the black ink discharge port surface of the print head 717, that is, in the direction in which the ink is discharged. Such movement of the slider 40 enables the caps 41 and 42 to move closer to (contact) the discharge port surface of the print head 717 and away from (separate from) the discharge port surface.

The cap 41 is used for cyan, magenta, and yellow color ink, and the cap 42 is used for black ink. A cap holder 44 and a cap holder 45 are mounted on the slider 40. In addition, in an area that differs from the print area, the slider 40 is movable in accordance with the movement of the print head 717 in the direction in which the printing unit 714 moves and in directions in which the print head 717 and the cap for each of black and color move closer to and away from each other. The caps 41 and 42 have pump tubes 51*a* and 51*b* connected thereto, respectively, and the pump tubes 51*a* and 51*b* are connected to a pump mechanism including a suction pump that generates negative pressure. By driving the suction pump, a recovery operation can be performed to suck ink from each of the discharge ports via the cap.

Figure 5:
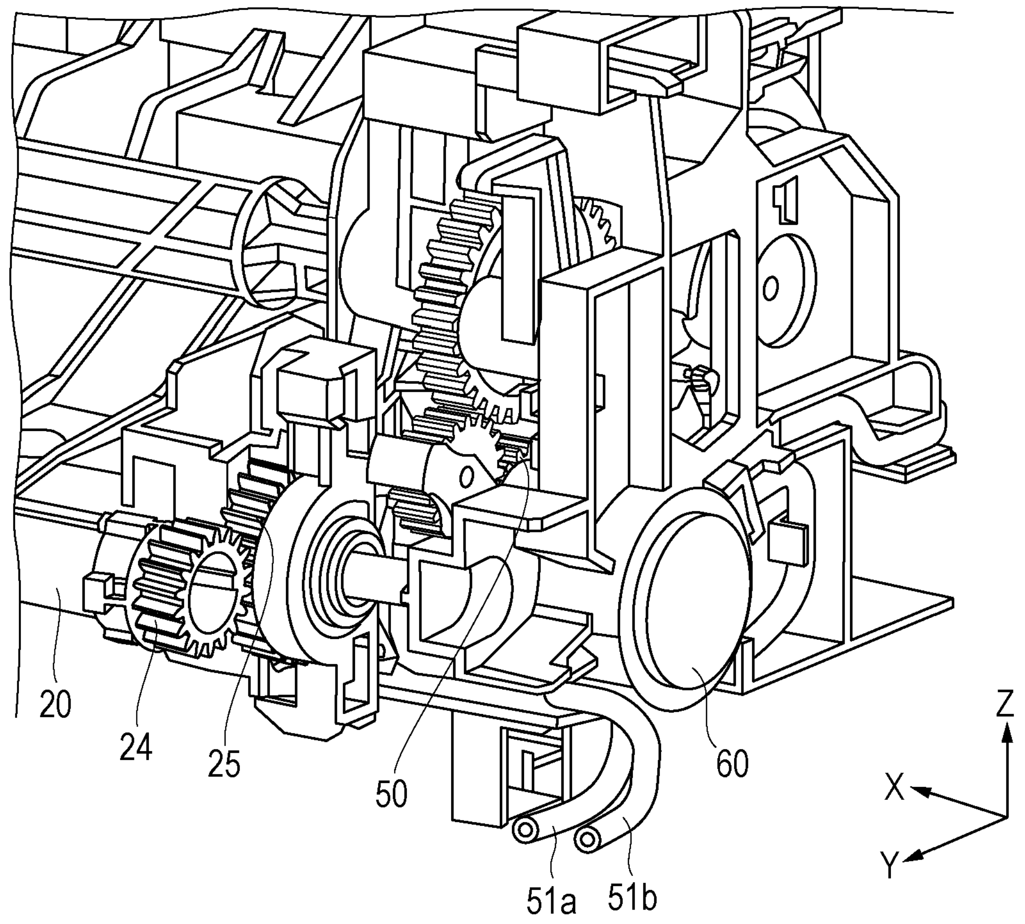
FIG. 5 is a perspective view of a drive transfer construction from a conveyance roller to a pump mechanism in the printing apparatus illustrated in FIG. 1.
Figure 6:
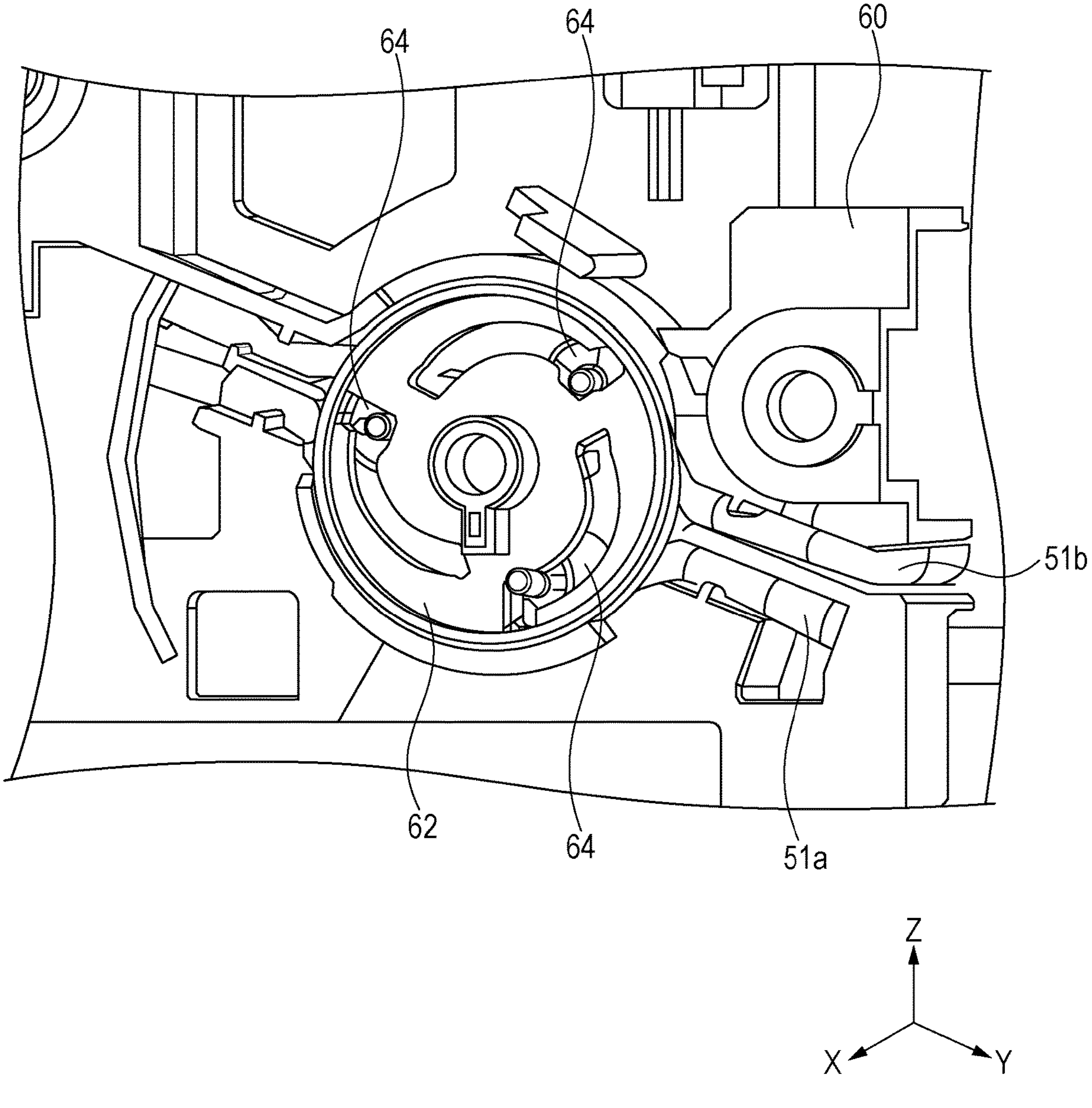
FIG. 6 is a perspective view of the pump mechanism illustrated in FIG. 5.

FIG. 5 is a perspective view of the drive transfer construction from the conveyance roller 10 to the pump mechanism, and FIG. 6 is a perspective view of the pump mechanism. Pump rollers 64 are attached to a pump roller holder 62. The pump tubes 51*a* and 51*b* extend along one-half the circumference of the inner wall of a pump base 60 and are rotatably inserted into the pump base 60. When the conveyance roller 10 is reversed due to drive force of the motor 21 with the print head 717 capped, the drive force is transmitted to the pump roller holder 62 via the conveyance output gear 24, the idler gear 25, and a pump drive gear 50. The pump rollers 64 move cams provided in the pump roller holder 62, so that the inner wall of the pump base 60 and the pump rollers 64 compress the pump tubes 51*a* and 51*b*. When the reverse driving of the conveyance roller 10 is continued, a negative pressure is generated inside the pump tubes 51*a* and 51*b*.

When the discharge port surface of the print head 717 is tightly capped by the caps 41 and 42 and a negative pressure is generated, ink can be sucked from the discharge ports of the print head 717 via the caps 41 and 42. When the discharge port surface is not capped and a negative pressure is generated, a discharge operation (an open suction action) can be performed for sucking and discharging ink accumulated in the cap due to preliminary discharge or the like. In addition, if, in the open suction action, the pump tubes 51*a* and 52*b* are individually compressed, ink suction from the nozzles or an open suction action in the cap can be performed on the caps 41 and 42 individually.

When the negative pressure inside the pump tube is released after the suction operation to suck ink is completed, the pump roller holder 62 is driven to rotate in the opposite direction. That is, the conveyance roller 10 is rotationally driven in the forward direction. By uncompressing the pump tubes 51*a* and 51*b* that are compressed by the pump rollers 64, the negative pressure inside the pump tubes is released.

Figure 7:
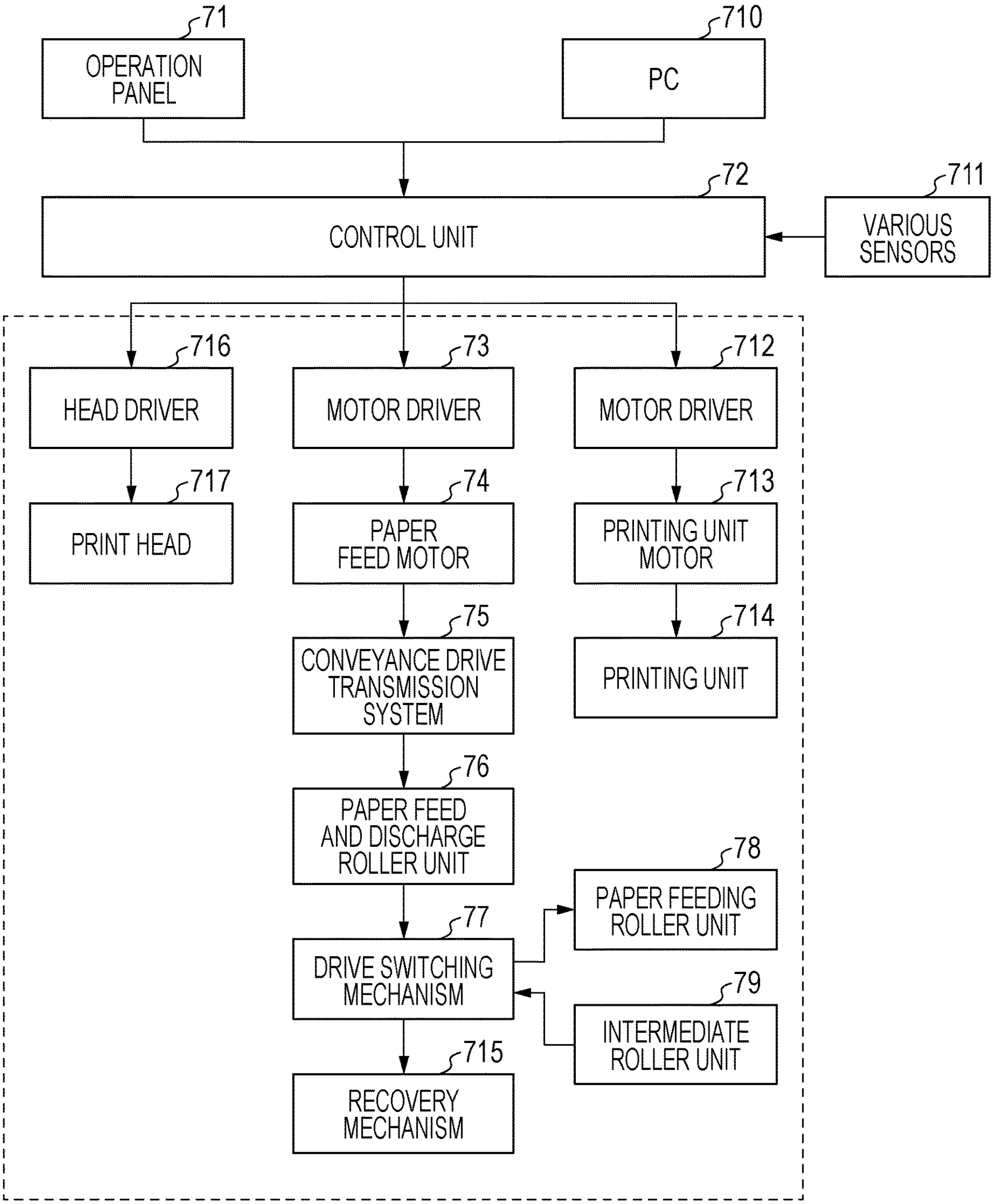
FIG. 7 is a block diagram of the outline of the control configuration of the printing apparatus illustrated in FIG. 1.

FIG. 7 is a block diagram of the outline of the control configuration according to the present embodiment. A control unit 72 includes a central processing unit (CPU), a read only memory (ROM), and a random access memory (RAM). The CPU performs various processing in accordance with programs stored in memories, such as a ROM and a RAM. A RAM is a volatile storage that temporarily stores programs and data. A ROM is a nonvolatile storage that stores table data and programs used in each of the processes (described below). As illustrated in FIG. 7, the control unit 72 outputs a motor current control signal to each of motor drivers 73 and 712 in accordance with an input from an operation panel 71 or a connected PC 710. Thus, the control unit 72 controls the operations described below.

A paper feed motor 74, which corresponds to the motor 21 for driving, for example, the above-described conveyance roller 10, drives a paper feed and discharge roller unit 76 via a conveyance drive transmission system 75 and a drive switching mechanism 77 in response to a signal input from the motor driver 73. In addition, a paper feeding roller unit 78 and an intermediate roller unit 79, which respectively correspond to the above-described conveyance roller 10 and intermediate roller 6, are similarly driven. The paper feed motor 74 drives the above-described pump tubes of the recovery mechanism.

Furthermore, a printing unit motor 713 drives the printing unit 714 in response to a signal input from the motor driver 712. A variety of sensors 711 provided in a paper conveyance unit and the printing unit 714 detect the position of the print medium P, the number of rotations of the conveyance roller 10, the printing position of the printing unit 714, and the like. The detected signals are input to the control unit 72, which outputs appropriate control signals to the motor drivers 73 and 712.

In addition, the control unit 72 outputs print data to a head driver 716 to drive the print head 717. The print data includes preliminary discharge data to ensure the discharge performance of the print head 717, as well as the image to be printed. According to the present embodiment, a preliminary discharge operation includes the following three types, that is, pre-printing preliminary discharge performed before a printing operation to print an image on a print medium, intra-printing preliminary discharge performed during the printing operation, and intra-standby preliminary discharge in preparation for the input of a subsequent print command. These types of preliminary discharges are performed to discharge ink that has thickened in the vicinity of the discharge ports. According to the present embodiment, the ink is discharged onto the caps. Preliminary discharge of color ink is performed toward the cap 41, and preliminary discharge of black ink is performed toward the cap 42.

Figure 8:
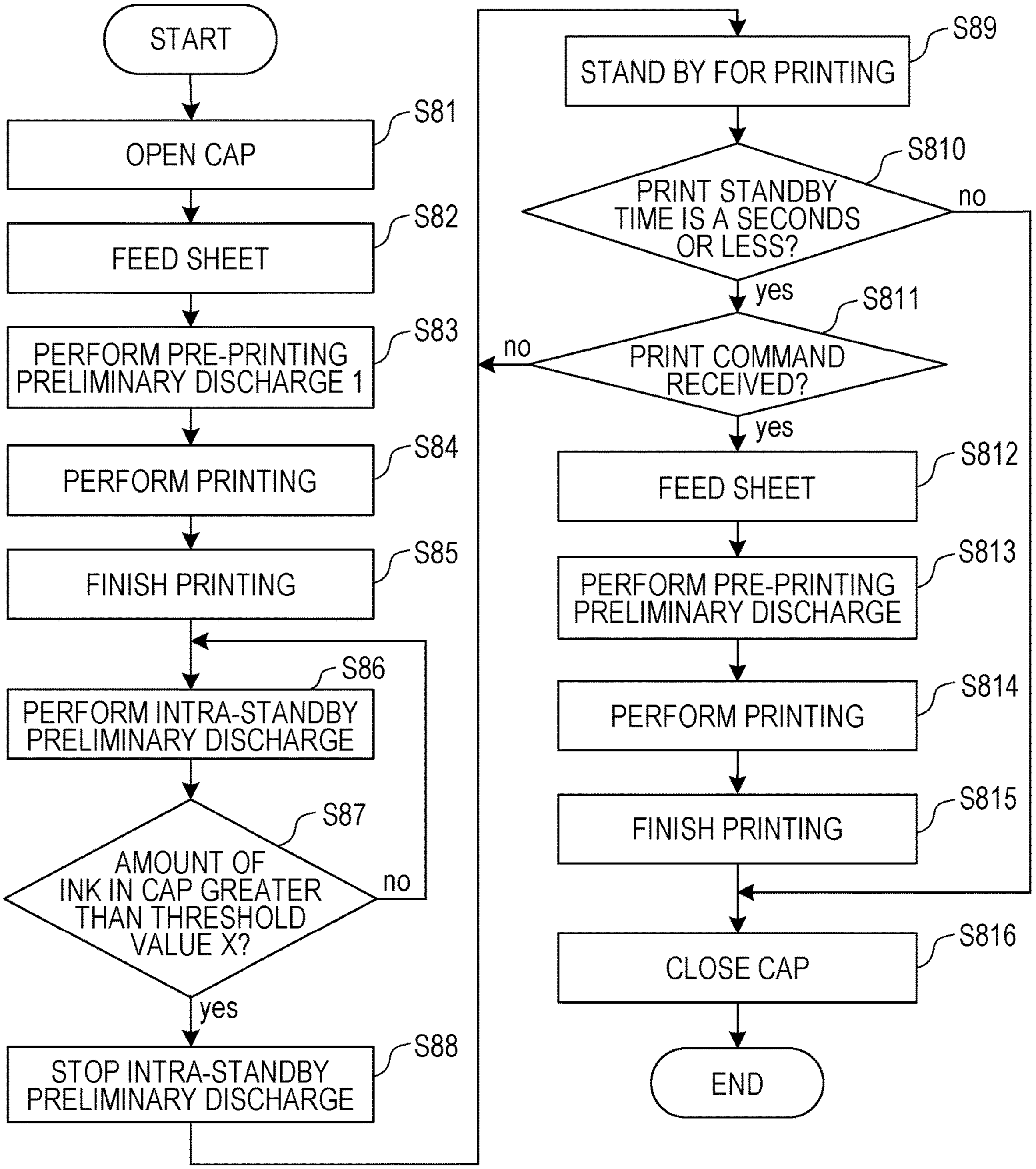
FIG. 8 is a flowchart of the control performed by the printing apparatus according to the first embodiment.

FIG. 8 is a flowchart relating to the printing operation according to the present embodiment. Hereinafter, a reference numeral starting with the letter "S" indicates "step". The flow starts when a printing apparatus receives a print command. In S81, a cap opening operation is performed. In S82, the print medium P is fed. During the sheet feeding operation for the print media P, in S83, a first pre-printing preliminary discharge (pre-printing preliminary discharge 1) is performed toward the caps 41 and 42. In S84, a printing operation to print an image on the print medium P is performed. In S85, the printing operation is finished. After the image printing operation is started, intra-printing preliminary discharge is performed toward the cap after the printing unit 714 finishes scanning and before starting the subsequent scanning. After the printing operation is finished, intra-standby preliminary discharge is performed in S86 in preparation for reception of the subsequent print command in the cap-open standby state. The intra-standby preliminary discharge is performed at predetermined time intervals. According to the present embodiment, the intervals are two-second intervals. The intra-standby preliminary discharge ensures the discharge performance in the subsequent printing operation even if there is a standby time until a subsequent reception command after the previous image is printed.

The control unit 72 counts the amount of ink discharged toward the cap, that is, the number of discharged ink droplets, in each of the first pre-printing preliminary discharge performed in S83, the intra-printing preliminary discharge performed in S84, and the intra-standby preliminary discharge performed in S86. Then, the control unit 72 stores the count result in the RAM of the control unit 72. According to the present embodiment, the count value is accumulated, and the accumulated value stored in the RAM is reset when the ink stored in the cap is discharged by an open suction action. In S87, the accumulated value of the amount of ink stored in the cap is calculated and compared with a threshold value X stored in advance. The comparison with the threshold value for the intra-standby preliminary discharge performed at predetermined time intervals is performed immediately before the intra-standby preliminary discharge performed at predetermined time intervals after the intra-standby preliminary discharge performed in S86. If the accumulated value is less than or equal to the threshold value X, the intra-standby preliminary discharge in S86 is continued. However, if the accumulated value is greater than the threshold value X, the processing proceeds to S88, where the intra-standby preliminary discharge is stopped. That is, the setting is changed from the setting of performing preliminary discharge at regular time intervals to the setting of not performing preliminary discharge, and the print head 717 stands by above the caps. The comparison of the accumulated value and the threshold value X in S87 is periodically performed until the upper limit of the standby time (described below) is reached or until the subsequent print command is received, and if the accumulated value does not exceed the threshold value, the process of stopping the intra-standby preliminary discharge in S88 is skipped.

The threshold value X is a value less than the cap capacity. In addition, it is desirable that the threshold value X be a value less than the cap capacity even if the amount of ink used in second pre-printing preliminary discharge performed when the subsequent print command is received and the amount of ink used in the intra-printing preliminary discharge are added to the threshold value X.

Subsequently, in S89, the printing apparatus stands by for reception of a subsequent print command. In S810, it is determined whether the standby time has exceeded a predetermined upper limit time. According to the present embodiment, "A seconds" is 300 seconds. The reason why the upper limit of the standby time is set in this way is to ensure the ink discharge performance. If the standby time with the cap open is too long, a large amount of ink needs be sucked from the nozzles to recover the ink discharge performance before the subsequent printing. If it is determined that the standby time is less than or equal to A seconds, the standby state is continued. However, if it is determined that the standby time is greater than A seconds, the standby state is terminated, and the processing proceeds to S816, where the cap is brought into tight contact with the print head 717 and is closed.

If, in S811, a print command is received while the standby time is less than or equal to A seconds, the standby state is terminated, and the processing proceeds to S812. In S812, the sheet feeding operation is performed. In S813, the pre-printing preliminary discharge is performed toward the cap to ensure the ink discharge performance during a subsequent printing operation. Thereafter, in S814, a printing operation is performed.

The conditions for pre-printing preliminary discharge in S813 differ in accordance with whether the intra-standby preliminary discharge is continued or stopped in the standby state. When a print command is received without stopping the intra-standby preliminary discharge, the first pre-printing preliminary discharge (pre-printing preliminary discharge 1) is performed. When a print command is received in a standby state with intra-standby preliminary discharge stopped, the second pre-printing preliminary discharge (pre-printing preliminary discharge 2) is performed. The second pre-printing preliminary discharge is characterized in that the discharge frequency is higher, the number of ink discharge operations is greater, or the discharge energy added to one discharge operation is greater than that of the first pre-printing preliminary discharge. The second pre-printing preliminary discharge corresponds to the event that the intra-standby preliminary discharge is stopped in S88 and is intended to improve the state in which the ink has thickened due to absence of intra-standby preliminary discharge. For this reason, the preliminary discharge conditions are determined so that a larger amount of ink is discharged than in the first pre-printing preliminary discharge.

In S815, the printing operation is finished. In S816, the cap is closed. Thus, the series of processes is completed.

As described above, according to the present embodiment, after completion of the printing operation, the intra-standby preliminary discharge is performed at predetermined time intervals until reception of a subsequent print command. At this time, the intra-standby preliminary discharge is stopped at the time when it is determined that the amount of ink in the cap is greater than a predetermined threshold value based on the capacity of the cap.

As a result, the ink can be prevented from spilling out of the cap by continuing the intra-standby preliminary discharge. In addition, when a subsequent print command is received, operations, such as cap opening, can be eliminated and, thus, the downtime can be reduced.

Figure 9:
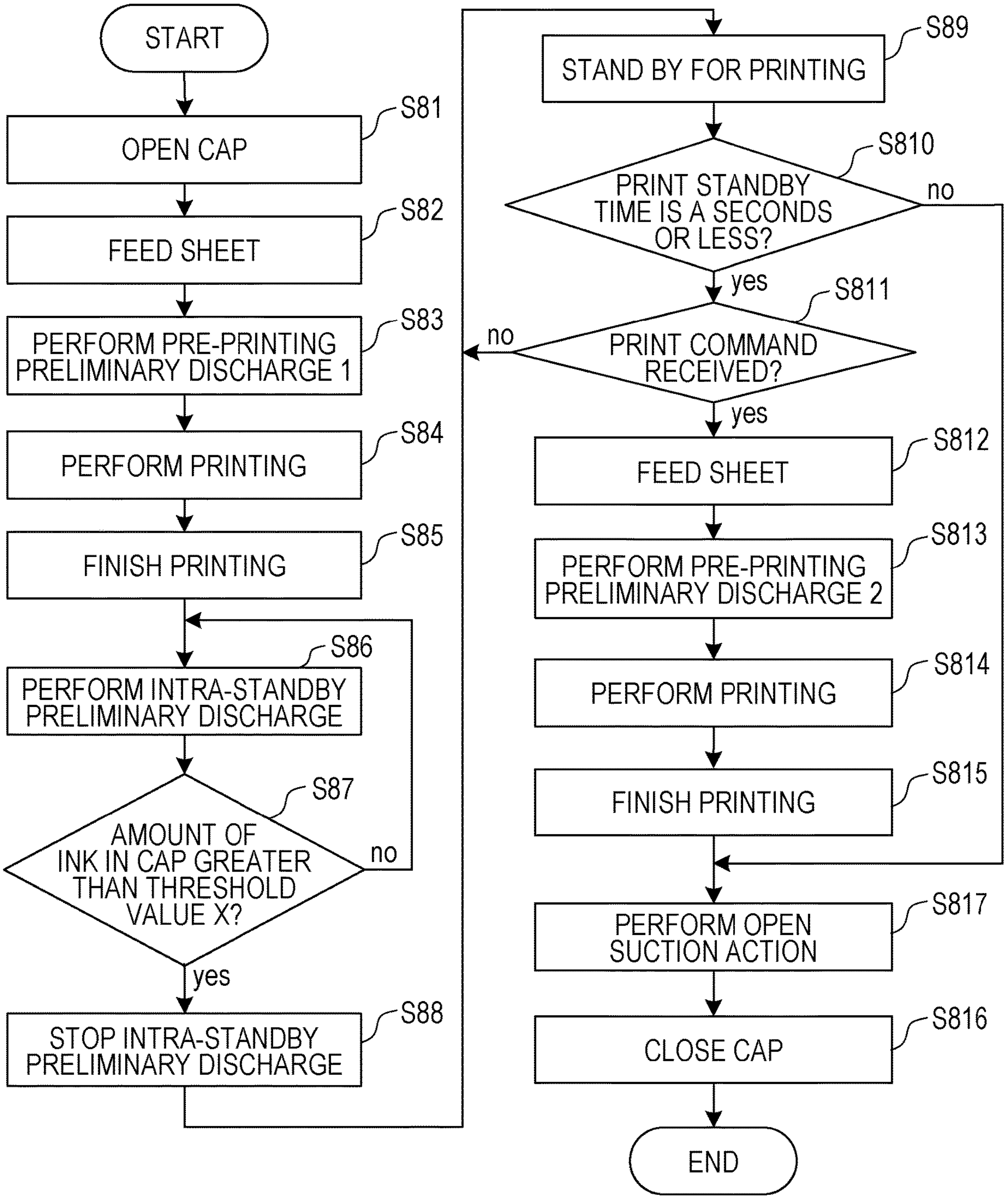
FIG. 9 is a flowchart of the control performed by the printing apparatus according to the first embodiment.

In addition, as illustrated in FIG. 9, if the standby time after the end of printing exceeds A seconds, the processing proceed to S817, where in preparation for a subsequent print command, an open suction action may be performed to discharge the ink accumulated in the cap due to the preliminary discharge. By performing the open suction action, the accumulated value that is in the RAM and that indicates the amount of ink in the cap can be reset.

Figure 10:
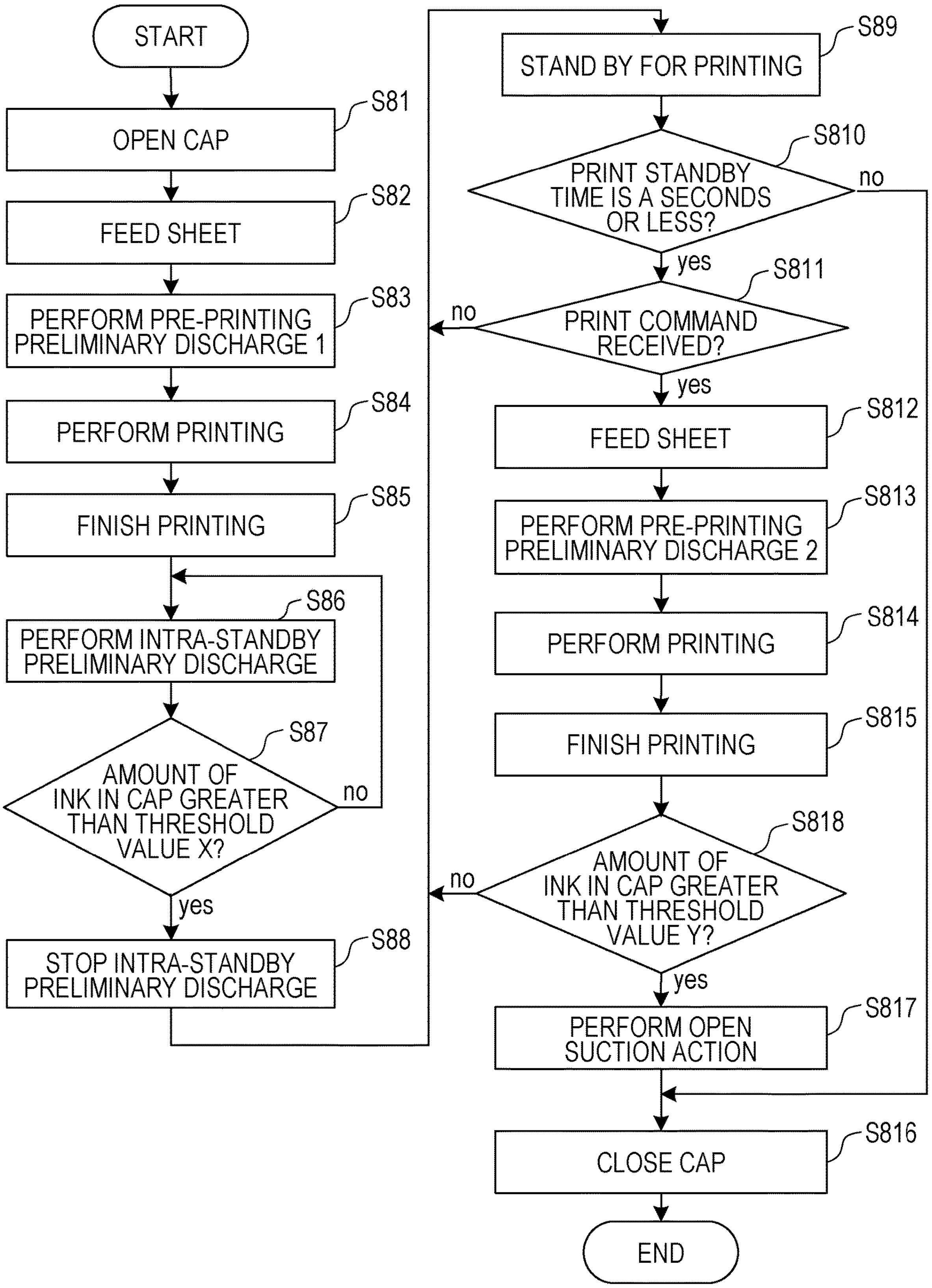
FIG. 10 is a flowchart of the control performed by the printing apparatus according to the first embodiment.

In addition, as illustrated in FIG. 10, it may be determined whether the amount of ink accumulated in the cap is less than or equal to a threshold value Y after the end of printing. If it is determined that the amount of ink accumulated in the cap is less than or equal to the threshold value Y, the processing returns to the printing standby operation in S89. If it is determined that the amount of ink accumulated in the cap is greater than the threshold value Y, the open suction action in S817 is performed and, thereafter, the cap is closed in S816. At this time, the relationship between the threshold value X and the threshold value Y is X<Y<cap capacity. By setting the threshold value Y in this way and comparing the threshold value Y with the amount of ink in the cap, the open suction action and cap closing can be postponed. As a result, the downtime can be reduced.

Although in FIGS. 9 and 10, the cap is closed after the open suction action is performed, only the open suction action may be performed.

Second Embodiment

Figure 11A:
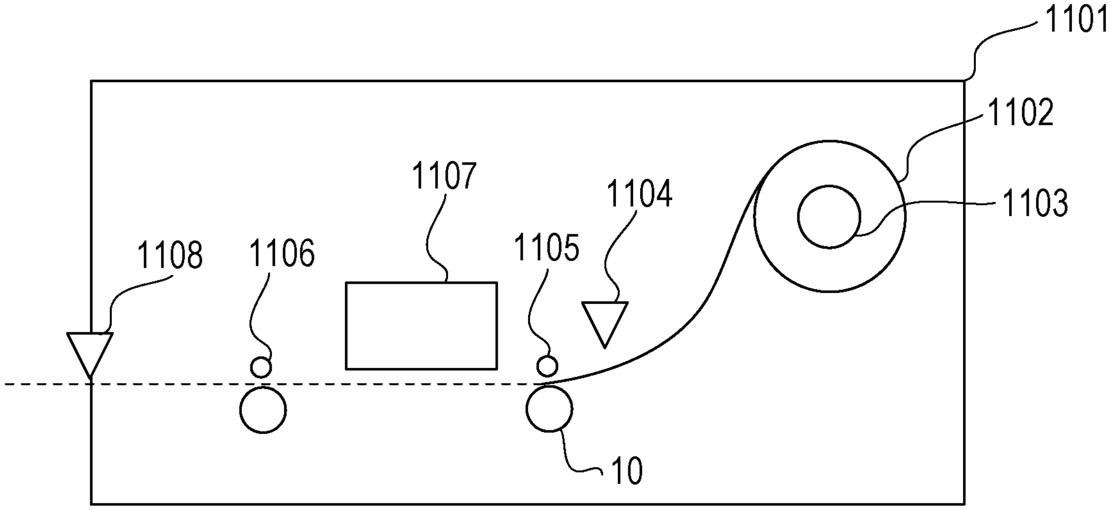
FIG. 11A is a vertical sectional view of an entire printing apparatus according to second and third embodiments.
Figure 11B:
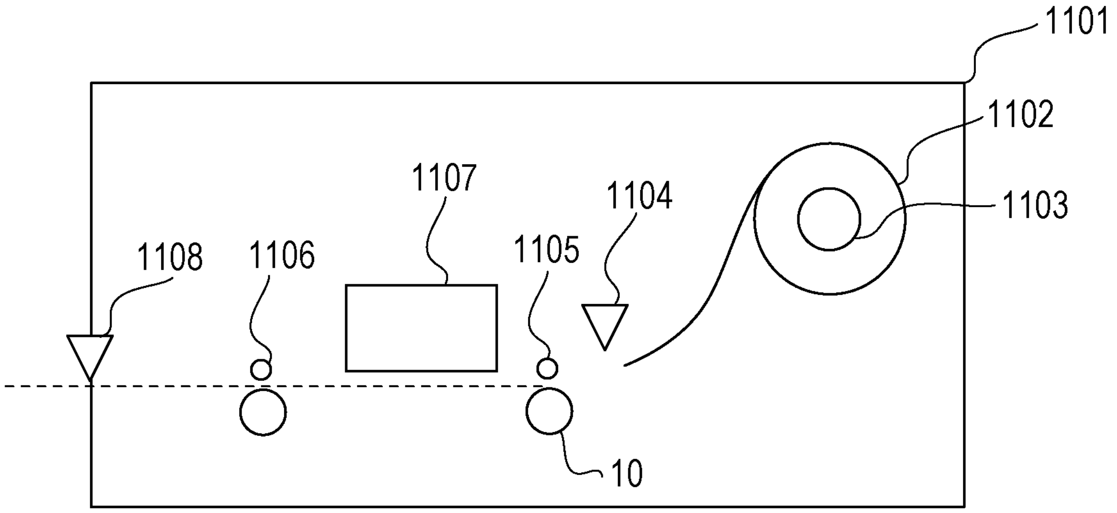
FIG. 11B is a vertical sectional view of the entire printing apparatus according to the second and third embodiments.

FIGS. 11A and 11B are cross-sectional views of an inkjet printing apparatus 1101 according to the second embodiment.

Roll paper 1102, which is a print medium, has a width of 24 inches. The roll paper 1102 is set in a roll paper holder 1103. A sensor 1104 detects the presence or absence of a print medium, and a pinch roller 1105 nips the roll paper, and a conveyance roller 10 is disposed to face the pinch roller 1105. A conveyance roller 1106 is disposed downstream in the conveyance direction, and a carriage 1107 includes the print head 717 mounted therein. A cutter 1108 cuts the roll paper after printing is completed. FIG. 11B illustrates the roll paper 1102 that is nipped by the pinch roller 1105. The transport drive configuration and recovery mechanism configuration according to the present embodiment are the same as those of the first embodiment.

A series of processes for the printing operation according to the present embodiment is the same as that in FIGS. 8 to 10. However, unlike the printing processes in FIGS. 8 to 10, after end of the printing in S85, the roll paper 1102 is nipped during a period from the intra-standby preliminary discharge in S86 to the end of printing in S815. According to the present embodiment, negative pressure is generated in the cap by reversing the conveyance roller 10. For this reason, to perform a cap closing operation to bring the print head 717 into contact with the cap and the open suction action to discharge ink in the cap, the roll paper 1102 needs to be released from the nip. As illustrated in FIG. 11B, when the roll paper 1102 is released from the nip, the leading edge of the roll paper is rewound to a position upstream of the sensor 1104. To perform the printing operation again after the roll paper 1102 is released from the nip, it takes time for nipping. For this reason, it is desirable to avoid releasing of the roll paper 1102 from the nip as much as possible.

In the processes illustrated in FIG. 8, since the print medium P is nipped even during the printing standby in S89, the paper feeding operation in S812 can be performed immediately after a print command is received in S811. The paper feeding operation here means the operation of conveying the print medium P from the nip position to an area in which the print head 717 can perform printing.

Figure 14:
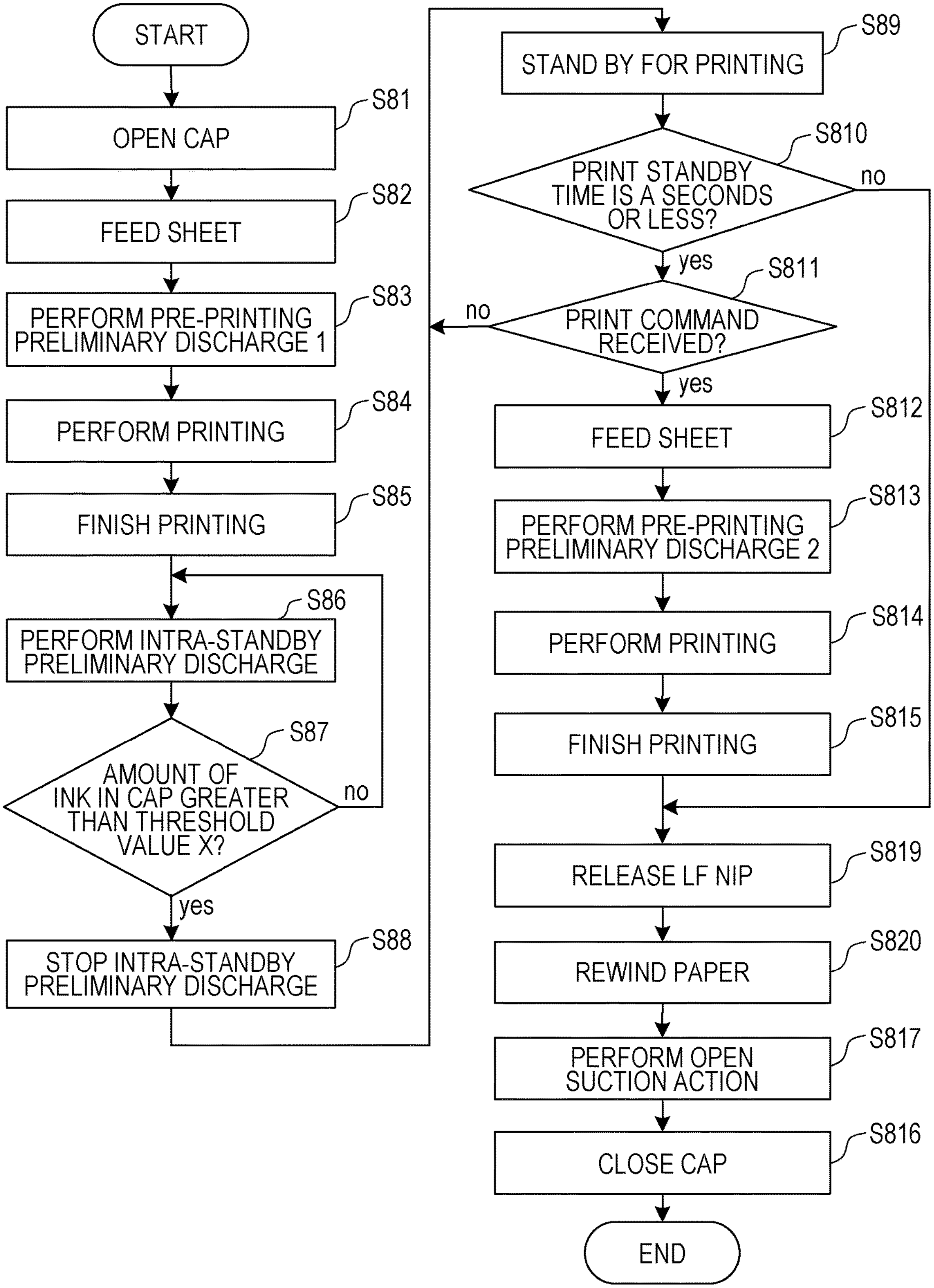
FIG. 14 is a flowchart illustrating the control performed by the printing apparatus according to the second embodiment.

In contrast, according to the present embodiment, when the roll paper 1102 is nipped, the caps 41 and 42 remain separated from the discharge port surface of the print head 717. As illustrated in FIG. 14, if the standby time starting from the end of printing is greater than A seconds during the printing standby in S89 or when the printing is finished in S815, the processing proceeds to S819, where the nip is released. In S820, the roll paper is rewound until the leading edge of the roll paper reaches a position upstream of the sensor 1104. In S817, the motor 21 is driven to perform an open suction action with the cap separated from the discharge port surface of the print head. Thereafter, in S816, the cap is closed.

Figure 15:
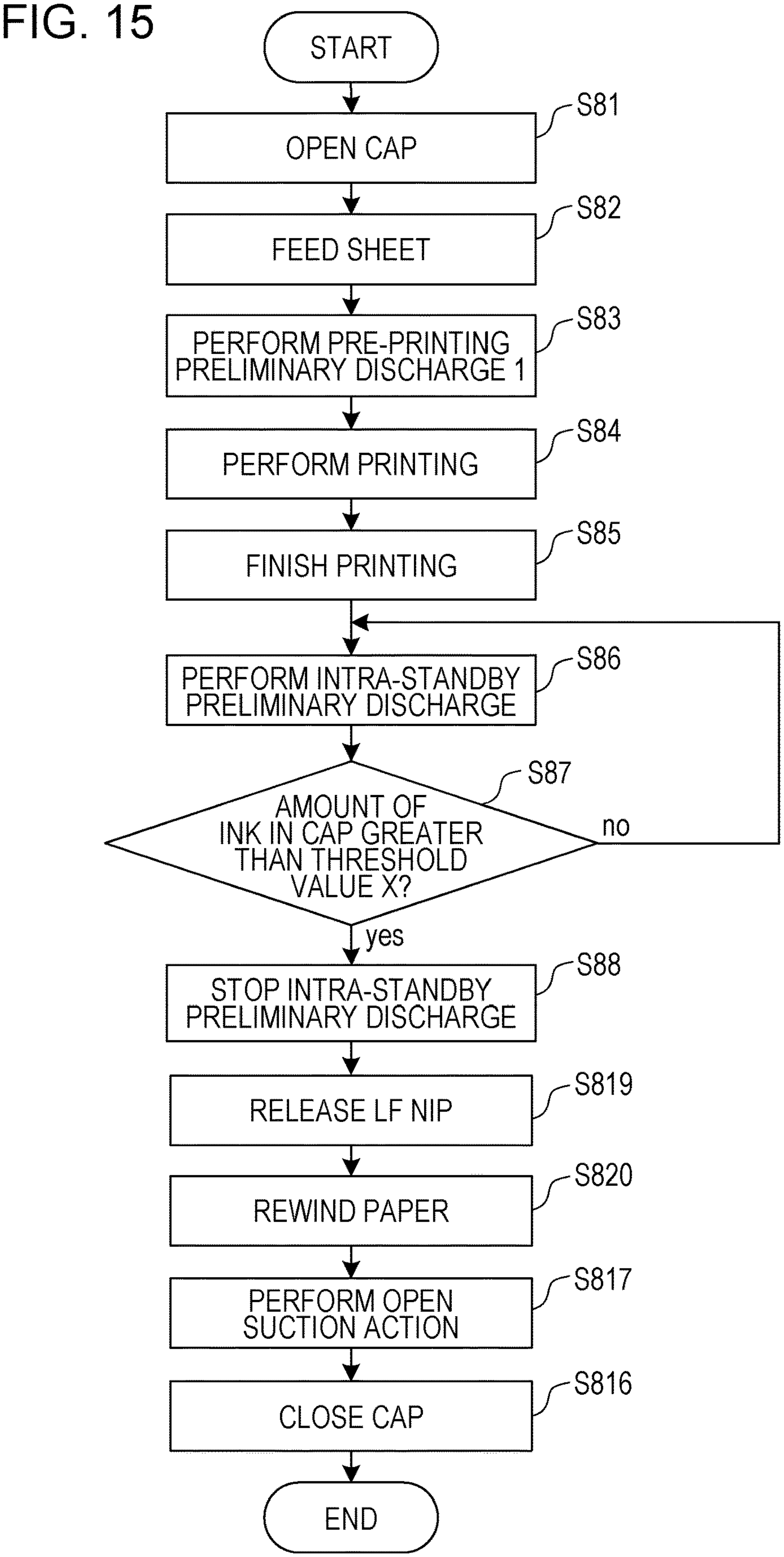
FIG. 15 is a flowchart illustrating the control performed by the printing apparatus according to the second embodiment.

Furthermore, according to the present embodiment, as illustrated in FIG. 15, the following configuration may be employed. That is, if in S87, it is determined that the accumulated value of the amount of ink stored in the cap is greater than the threshold value X of the cap capacity during intra-standby preliminary discharge in S86, the preliminary discharge is stopped in S88. Thereafter, the processing proceeds to S819, where the nip is released. In S820, the roll paper is rewound until the leading edge of the roll paper reaches a position upstream of the sensor 1104. In S817, the motor 21 is driven to perform an open suction action with the cap separated from the discharge port surface of the print head. In S816, the cap is closed.

As described above, like the first embodiment, the setting is changed so that when the accumulated value of the amount of ink stored in the cap reaches a predetermined threshold value of the cap capacity, the roll paper remains nipped and periodic intra-standby preliminary discharge is not performed. As a result, spillover of ink from the cap can be prevented. Furthermore, according to the present embodiment, when a subsequent print command is received, the downtime can be reduced by eliminating the re-nipping operation required for paper feeding. In addition, by using a threshold value corresponding to the cap capacity, the timing of performing the open suction action is delayed as much as possible, and the nip release and a re-nipping operation required for performing an open suction action are reduced, which further reduces the downtime.

Third Embodiment

Figure 12:
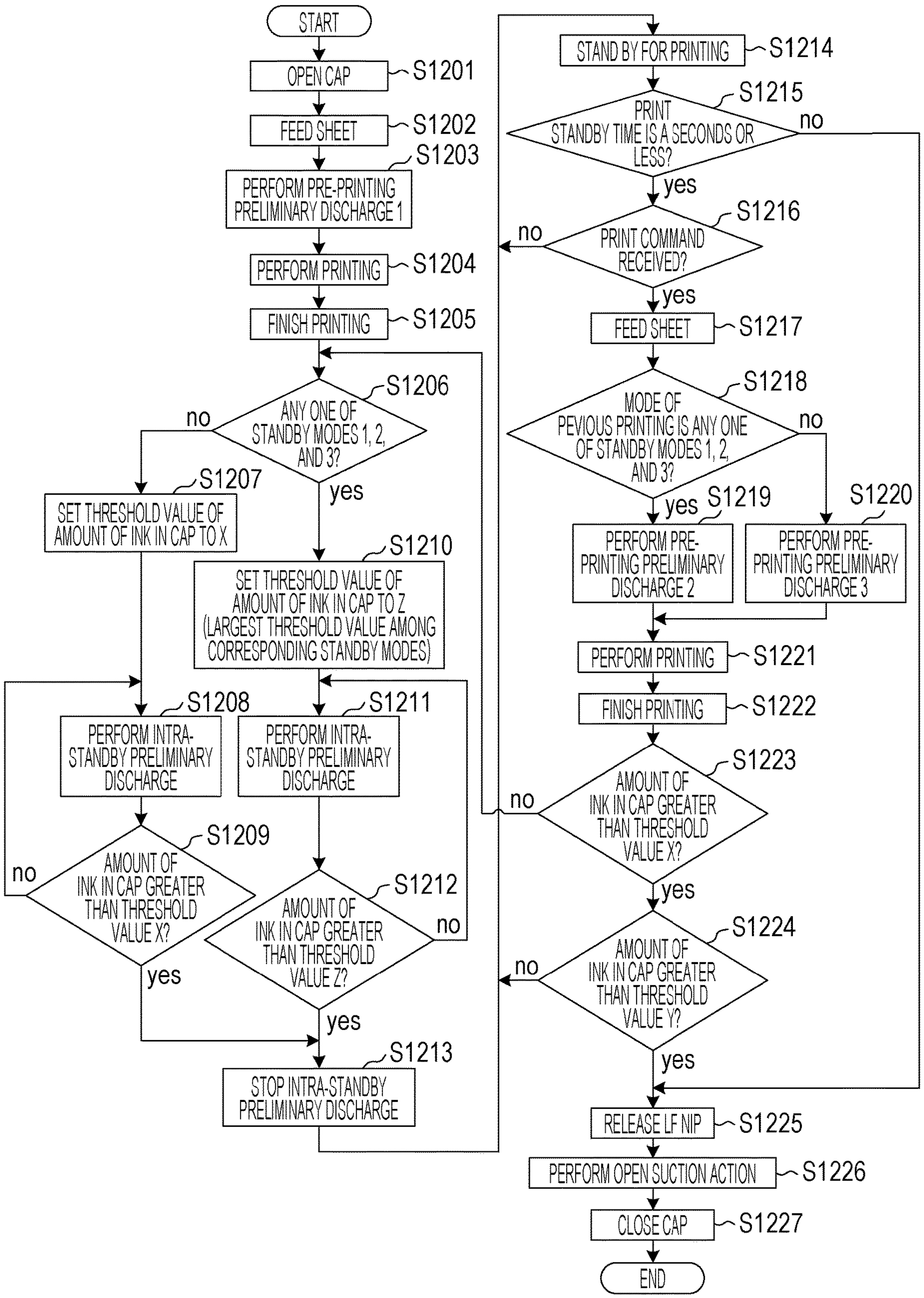
FIG. 12 is a flowchart of the control performed by the printing apparatus according to the third embodiment.

The configuration of an inkjet printing apparatus according to the third embodiment is the same as in the second embodiment. FIG. 12 illustrates the flow of the printing operation according to the present embodiment. The processing up to the end of printing in S1205 is the same as that in the second embodiment.

After printing is finished, the roll paper 1102 remains nipped, and the caps 41 and 42 remain separated from the discharge port surface of the print head 717 in preparation for a subsequent print command. In S1206, it is determined whether the printing apparatus is in a standby mode. The standby mode is described in detail below. Standby mode 1 is an inter-page delay mode, standby mode 2 is an eject cut mode, and standby mode 3 is a user cut mode.

The inter-page delay in standby mode 1 is based on the assumption that a printed subject cut by the cutter 1108 is dropped into a basket (not illustrated) or the like after the end of printing. In the case of a print medium onto which ink is difficult to fix, such as a film, the area where an image is printed may be rubbed when the printed subject drops, resulting in an image defect, such as disappearance of part of the ink image. To prevent the occurrence of such an image defect, a predetermined wait time is provided between the end of printing and the cutting by the cutter 1108 to improve the fixability of the ink. A user can set the wait time for the inter-page delay to any value by using the host apparatus or a UI of the printing apparatus (not illustrated).

The eject cut in standby mode 2 is a mode in which the user determines the timing of cutting by the cutter 1108 after printing is finished. At the timing when the user wants to cut, the user sends an instruction to command the cutting operation from the host apparatus or the UI of the printing apparatus.

The user cut in standby mode 3 is a mode in which if the print medium is of a type that is difficult to cut by the cutter 1108, the user manually cuts the print medium. After cutting the print medium, the user inputs information indicating that a cutting operation is finished by using the host apparatus or the UI of the printing apparatus.

In any of standby modes 1 to 3, a standby time is required after printing is finished. For this reason, intra-standby preliminary discharge is performed in preparation for the subsequent print command. In S1206, it is determined whether any of the standby modes 1 to 3 is applied. In S1210, the largest threshold value Z among the applicable standby modes is set as the threshold value for the amount of ink in the cap. For example, let Z1, Z2, and Z3 be the threshold value for inter-page delay in standby mode 1, the threshold value for eject cut in standby mode 2, and the threshold value for user cut in standby mode 3, respectively. Then, $Z1>Z2>Z3$. Thereafter, in S1211, intra-standby preliminary discharge is performed at predetermined intervals as described above. Subsequently, in S1212, the accumulated value of the amount of ink in the cap stored in the RAM is compared with the threshold value. If it is determined that the accumulated value of the amount of ink in the cap is less than or equal to the threshold value Z, the processing proceeds to S1211, where intra-standby preliminary discharge is continued. However, if it is determined that the accumulated value of the amount of ink in the cap is greater than the threshold value Z, the setting is changed in S1213 so that the intra-standby preliminary discharge is stopped.

In contrast, in the case of normal standby that does not correspond to any one of standby modes 1 to 3, the processing proceeds to S1207, where the threshold value of the amount of ink in the cap is set to X. Thereafter, in S1208, intra-standby preliminary discharge is performed at predetermined intervals. In S1209, the accumulated value of the amount of ink in the cap stored in the RAM is compared with the threshold value X. If it is determined that the accumulated value of the amount of ink in the cap is less than or equal to the threshold value X, intra-standby preliminary discharge is continued at predetermined intervals in S1208. However, if the accumulated value of the amount of ink in the cap is greater than the threshold value X, the setting is changed in S1213 so that the intra-standby preliminary discharge is stopped.

The relationship between the threshold value X and the threshold value Z is Z<X. The reason for this is that standby modes 1 to 3 have a long standby time and the amount of ink discharged to the cap due to the intra-standby preliminary discharge increases, leading to spillover of ink from the cap. In addition, the number of open suction actions required to prevent spillover of ink from the cap increases, leading to an increase in downtime. Thus, in the case of standby modes 1 to 3, it is desirable to change the setting so that the intra-standby preliminary discharge is stopped as soon as possible.

After stopping the intra-standby preliminary discharge, the printing apparatus stands by for printing with the roll paper being nipped (S1214). In S1215, it is determined whether the standby time is less than or equal to A seconds (300 seconds according to the present embodiment). If it is determined that the standby time is greater than A seconds, the nip is released in S1225, an open suction action is performed in S1226, and the cap is closed in S1227. However, if, in S1216, the print command is received before the standby time becomes greater than A seconds, the paper feeding operation is performed in S1217. Thereafter, in S1218, it is determined whether the previous printing operation corresponds to any one of the standby modes 1 to 3. If the previous printing operation corresponds to any one of the standby modes 1 to 3, the processing proceeds to S1219, where the second pre-printing preliminary discharge is performed into the cap to ensure the discharge performance at the time of subsequent printing. Thereafter, in S1221, a printing operation is performed. In S1222, the printing finishes. However, if the previous printing operation does not correspond to any one of standby modes 1 to 3, third pre-printing preliminary discharge (pre-printing preliminary discharge 3) is performed into the cap in S1220. Thereafter, in S1221, a printing operation is performed. In S1222 the printing finishes. The relationship among the pre-printing preliminary discharges in terms of the discharge frequency, the number of discharges, or the discharge energy, is as follows: first pre-printing preliminary discharge<second pre-printing preliminary discharge<third pre-printing preliminary discharge.

This is because in the case of standby modes 1 to 3, the time during which the intra-standby preliminary discharge is stopped is long and, thus, the viscosity of the ink around the nozzles increases.

After printing is finished, it is determined whether the amount of ink in the cap is greater than the threshold value X. If it is determined that the amount of ink in the cap is less than or equal to the threshold value X, the processing returns to the standby mode determination process in S1206. However, if it is determined that the amount of ink in the cap is greater than the threshold value X, the processing proceeds to S1224, where it is determined whether the amount of ink in the cap is greater than the threshold value Y. If it is determined that the amount of ink in the cap is less than or equal to the threshold value Y, the processing returns to the print standby process in S1214. However, if it is determined that the amount of ink in the cap is greater than the threshold value Y, the LF nip is released in S1225, the roll paper 1102 is returned to the position where the leading edge of the roll paper 1102 has passed the sensor 1104, and the printing apparatus goes standby. Thereafter, in S1226, an open suction action is performed by reversing the conveyance roller 10 with the cap separated from the discharge port surface of the print head 717. In S1227, the cap is closed.

As described above, according to the present embodiment, it is determined in which one of standby modes 1 to 3 the printing apparatus is. As a result, the threshold value used for comparison with the amount of ink in the cap can be appropriately set.

Fourth Embodiment

Figure 16:
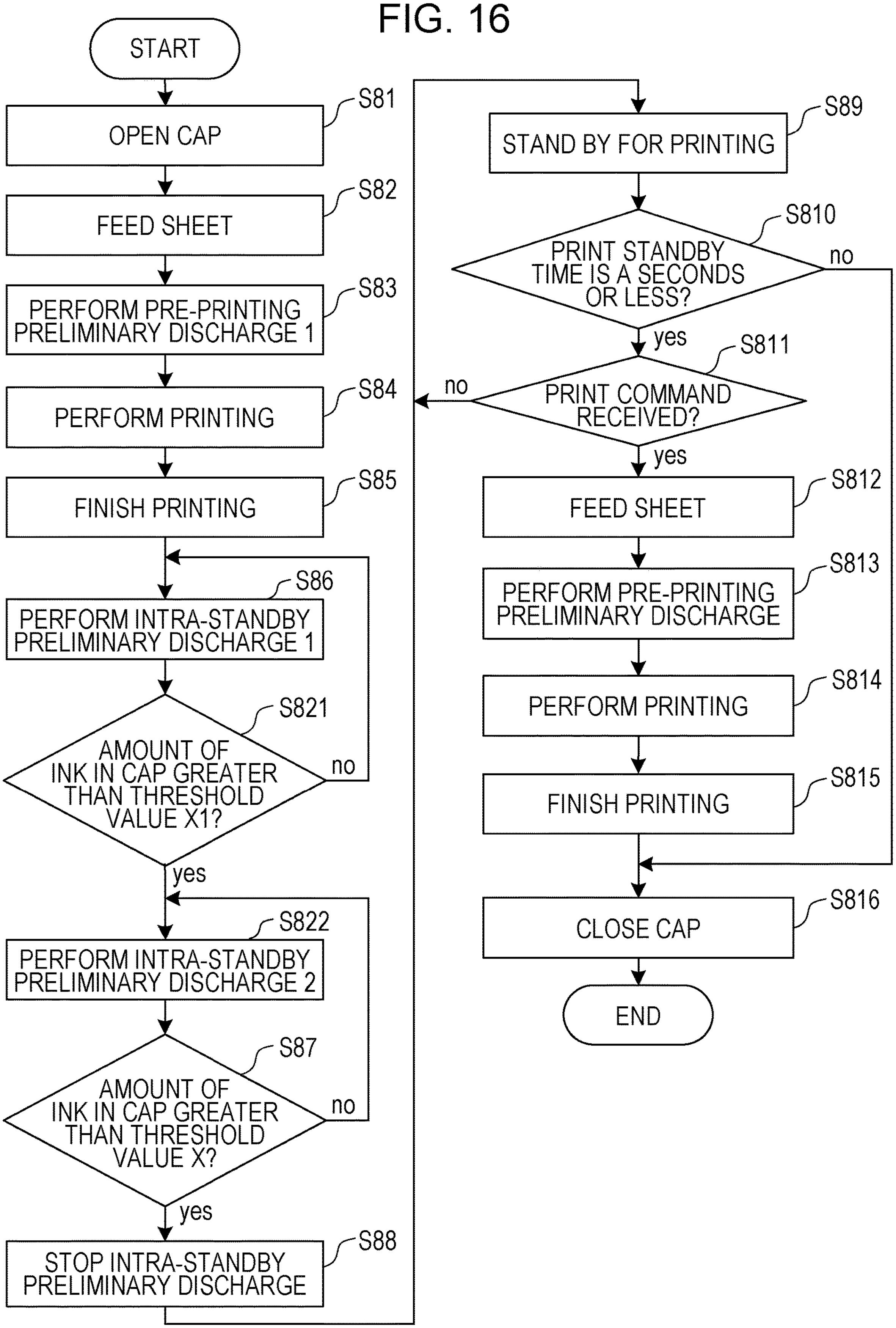
FIG. 16 is a flowchart illustrating the control performed by a printing apparatus according to a fourth embodiment.

The first to third embodiments have been described with reference to the examples in which the accumulated value of the amount of ink preliminarily discharged into the cap is compared with the threshold value X and, if the accumulated value is greater than the threshold value X, the intra-standby preliminary discharge is stopped. According to the present embodiment, as illustrated in FIG. 16, if the accumulated value is greater than a first threshold value, the amount of ink in intra-standby preliminary discharge or the time interval of intra-standby preliminary discharges may be changed. If the accumulated value is greater than a second threshold value, intra-standby preliminary discharge may be stopped. FIG. 16 is a flowchart obtained by replacing the processes prior to “stand by for printing” in FIGS. 8 to 10 with the processes of the present embodiment. After the end of printing in S85, intra-standby preliminary discharge 1 is performed in S86. During intra-standby preliminary discharge 1, 8-droplet preliminary discharge is performed by each of the nozzles at intervals of 2 seconds. In S821, the accumulated value of the amount of ink stored in the cap is calculated before intra-standby preliminary discharge 1 is performed and is compared with a threshold value X1. If the accumulated value is less than or equal to the threshold value X1, intra-standby preliminary discharge 1 in S86 is continued. However, if the accumulated value is greater than the threshold value X1, the processing proceeds to S822, where intra-standby preliminary discharge 2 is performed. Intra-standby preliminary discharge 2 is characterized in that the preliminary discharge interval is greater or the number of preliminary discharges from each nozzle is less than that of intra-standby preliminary discharge 1. More specifically, intra-standby preliminary discharge 2 is 8-droplet preliminary discharge from each of the nozzles at intervals of 4 seconds or 4-droplet preliminary discharge from each nozzle at intervals of 2 seconds. Subsequently, in S87, the accumulated value of the amount of ink stored in the cap is calculated and compared with the threshold value X. If the accumulated value is less than or equal to the threshold value X, intra-standby preliminary discharge 2 in S822 is continued. However, if the accumulated value is greater than the threshold value X, the processing proceeds to S88, where the intra-standby preliminary discharge is stopped. In S89, the printing apparatus stands by for printing. The threshold value X1 is less than the threshold value X.

The subsequent steps are the same as in the first to third embodiments.

As described above, according to the present embodiment, when the accumulated value of the amount of ink preliminary discharged into the cap is greater than the first threshold value, the intra-standby preliminary discharge interval is increased, or the number of droplets of preliminary discharge is reduced. As a result, the time until spillover of ink from the cap can be increased. In addition, spillover of ink from the cap can be prevented by stopping intra-standby preliminary discharge if the accumulated value is greater than the second threshold value.

The present disclosure includes configurations represented by examples of printing apparatuses and printing apparatus control method described below.

Configuration 1

An inkjet printing apparatus includes a print head including a plurality of nozzles, each discharging ink onto a print medium, a cap configured to receive ink discharged from the print head during a preliminary discharge operation, a storing unit configured to store a value corresponding to the amount of ink discharged to the cap during the preliminary discharge operation, and a control unit configured to control the print head to start an intra-standby preliminary discharge operation in which the preliminary discharge operation is performed at predetermined time intervals during a standby period after the print head finishes a printing operation to print an image, continue the intra-standby preliminary discharge operation if an accumulated value of the amount of ink stored in the storing unit is not greater than a threshold value, stop the intra-standby preliminary discharge operation if the accumulated value of the amount of ink is greater than the threshold value, and bring the print head into contact with the cap and terminate the standby period if the standby period exceeds a predetermined time period.

Configuration 2

In the inkjet printing apparatus according to configuration 1, upon receiving a print command relating to a subsequent printing operation during the standby period, the control unit terminates the standby period.

Configuration 3

The inkjet printing apparatus according to Configuration 1 or 2 further includes a conveyance motor and a motor configured to drive a carriage. The intra-standby preliminary discharge operation is started when the conveyance motor and the motor that drives the carriage are not driven for a predetermined time period.

Configuration 4

The inkjet printing apparatus according to any one of Configurations 1 to 3 further includes a discharge unit configured to perform a discharge operation to discharge ink in the cap with the print head not in contact with the cap.

Configuration 5

In the inkjet printing apparatus according to Configuration 4, the discharge unit performs the discharge operation if the standby period exceeds a predetermined time period.

Configuration 6

In the inkjet printing apparatus according to Configuration 4 or 5, if the discharge operation is performed by the discharge unit, the storing unit resets the stored accumulated value.

Configuration 7

In the inkjet printing apparatus according to any one of Configurations 1 to 6, the control unit controls the print head to perform a pre-printing preliminary discharge operation in which ink is discharged into the cap before starting a printing operation subsequent to the printing operation.

Configuration 8

In the inkjet printing apparatus according to Configuration 7, upon receiving a print command after continuously performing the intra-standby preliminary discharge operation, the control unit performs a first pre-printing preliminary discharge operation, and upon receiving a print command after the intra-standby preliminary discharge operation is stopped, the control unit performs a second pre-printing preliminary discharge operation in which an amount of ink to be used is greater than in the first pre-printing preliminary discharge operation.

Configuration 9

In the inkjet printing apparatus according to any one of Configurations 1 to 8, the control unit controls the print head to perform an intra-printing preliminary discharge operation in which ink is discharged into the cap during the printing operation.

Configuration 10

The inkjet printing apparatus according to any one of Configurations 1 to 9 further includes a conveyance roller configured to convey the print medium and a member configured to face the conveyance roller and nip the print medium. The print medium is roll paper, and the intra-standby preliminary discharge operation is performed with the print medium nipped.

Configuration 11

The inkjet printing apparatus according to Configuration 10 further includes a motor configured to function as a drive source for nipping the print medium. The motor is a drive source of a discharge operation to discharge ink in the cap with the print head not in contact with the cap.

Configuration 12

The inkjet printing apparatus according to one of Configurations 1 to 11 further includes a determination unit configured to determine whether the print head is in a normal standby mode, an inter-page delay standby mode, an eject cut standby mode, or a user cut standby mode after the printing operation is finished, and the threshold value is changed on the basis of a result of the determination made by the determination unit.

Configuration 13

In the inkjet printing apparatus according to Configuration 12, the threshold value in each of the inter-page delay standby mode, the eject cut standby mode, and the user cut standby mode is less than in the normal standby mode.

Configuration 14

An inkjet printing apparatus includes a print head including a plurality of nozzles, each discharging ink onto a print medium, a cap configured to receive ink discharged from the print head during a preliminary discharge operation, a storing unit configured to store a value corresponding to the amount of ink discharged to the cap during the preliminary discharge operation, and a control unit configured to control the print head to start an intra-standby preliminary discharge operation in which the preliminary discharge operation is performed at predetermined time intervals during a standby period after the print head finishes a printing operation to print an image and increase the time interval of the intra-standby preliminary discharge operation if an accumulated value of the amount of ink stored in the storing unit is greater than a first threshold value.

Configuration 15

An inkjet printing apparatus includes a print head including a plurality of nozzles, each discharging ink onto a print medium, a cap configured to receive ink discharged from the print head during a preliminary discharge operation, a storing unit configured to store a value corresponding to the amount of ink discharged to the cap during the preliminary discharge operation, and a control unit configured to control the print head to start an intra-standby preliminary discharge operation in which the preliminary discharge operation is performed at predetermined time intervals during a standby period after the print head finishes a printing operation to print an image and decrease the number of droplets of the intra-standby preliminary discharge operation if an accumulated value of the amount of ink stored in the storing unit is greater than a first threshold value.

Configuration 16

A method for controlling a print head is provided. The print head includes a plurality of nozzles, each discharging ink onto a print medium. The method includes starting an intra-standby preliminary discharge operation performed by the print head in which a preliminary discharge operation to discharge ink into a cap is performed at predetermined time intervals during a standby period after the print head finishes a printing operation to print an image, continuing the intra-standby preliminary discharge operation if an accumulated value of the amount of ink stored in a storing unit during the preliminary discharge operation is not greater than a threshold value, stopping the intra-standby preliminary discharge operation if the accumulated value of the amount of ink is greater than the threshold value, and bringing the print head into contact with the cap and terminating the standby period if the standby period exceeds a predetermined time period.

Configuration 17

A method for controlling a print head is provided. The print head includes a plurality of nozzles, each discharging ink onto a print medium. The method includes starting an intra-standby preliminary discharge operation performed by the print head in which a preliminary discharge operation to discharge ink into a cap is performed at predetermined time intervals during a standby period after the print head finishes a printing operation to print an image and increasing the time interval of the intra-standby preliminary discharge operation if an accumulated value of the amount of ink is greater than a threshold value.

Configuration 18

A method for controlling a print head is provided. The print head includes a plurality of nozzles, each discharging ink onto a print medium. The method includes starting an intra-standby preliminary discharge operation performed by the print head in which a preliminary discharge operation to discharge ink into a cap is performed at predetermined time intervals during a standby period after the print head finishes a printing operation to print an image and decreasing the number of droplets of the intra-standby preliminary discharge operation if an accumulated value of the amount of ink is greater than a threshold value.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192449 filed Nov. 26, 2021 and No. 2022-166368 filed Oct. 17, 2022, which are hereby incorporated by reference herein in their entirety.

What is claimed is:

1. An inkjet printing apparatus comprising:

a print head including a plurality of nozzles, each configured to discharge ink onto a print medium;

a cap configured to receive ink discharged from the print head during a preliminary discharge operation;

a storing unit configured to store a value corresponding to an amount of ink discharged to the cap during the preliminary discharge operation; and a control unit configured to control the print head to start an intra-standby preliminary discharge operation in which the preliminary discharge operation is performed at predetermined time intervals during a standby period after the print head finishes a printing operation to print an image, continue the intra-standby preliminary discharge operation if an accumulated value of the amount of ink stored in the storing unit is not greater than a threshold value, stop the intra-standby preliminary discharge operation if the stored accumulated value of the amount of ink is greater than the threshold value, and bring the print head into contact with the cap and terminate the standby period if the standby period exceeds a first predetermined time period.

2. The inkjet printing apparatus according to claim 1, wherein, upon receiving a print command relating to a subsequent printing operation during the standby period, the control unit terminates the standby period.

3. The inkjet printing apparatus according to claim 1, further comprising:

a conveyance motor; and a motor configured to drive a carriage configured to move the print head, wherein the intra-standby preliminary discharge operation is started when the conveyance motor and the motor that drives the carriage are not driven for a second predetermined time period.

4. The inkjet printing apparatus according to claim 1, further comprising a discharge unit configured to perform a discharge operation to discharge ink in the cap with the print head not in contact with the cap.

5. The inkjet printing apparatus according to claim 4, wherein the discharge unit performs the discharge operation if the standby period exceeds a third predetermined time period.

6. The inkjet printing apparatus according to claim 4, wherein, if the discharge operation is performed by the discharge unit, the storing unit resets the stored accumulated value of the amount of ink.

7. The inkjet printing apparatus according to claim 1, wherein the control unit controls the print head to perform a pre-printing preliminary discharge operation in which ink is discharged into the cap before starting a subsequent printing operation subsequent to the printing operation.

8. The inkjet printing apparatus according to claim 7, wherein, upon receiving a print command after continuously performing the intra-standby preliminary discharge operation, the control unit performs a first pre-printing preliminary discharge operation, and wherein, upon receiving a print command after the intra-standby preliminary discharge operation is stopped, the control unit performs a second pre-printing preliminary discharge operation in which an amount of ink to be used is greater than in the first pre-printing preliminary discharge operation.

9. The inkjet printing apparatus according to claim 1, wherein the control unit controls the print head to perform an intra-printing preliminary discharge operation in which ink is discharged into the cap during the printing operation.

10. The inkjet printing apparatus according to claim 1, further comprising:

a conveyance roller configured to convey the print medium; and a member configured to face the conveyance roller and nip the print medium, wherein the print medium is roll paper, and wherein the intra-standby preliminary discharge operation is performed with the print medium nipped.

11. The inkjet printing apparatus according to claim 10, further comprising a motor configured to function as a drive source for nipping the print medium, wherein the motor is a drive source of a discharge operation to discharge ink in the cap with the print head not in contact with the cap.

12. The inkjet printing apparatus according to claim 1, further comprising a determination unit configured to determine whether the print head is in a normal standby mode, an inter-page delay standby mode, an eject cut standby mode, or a user cut standby mode after the printing operation is finished, and wherein the threshold value is changed based on a result of the determination made by the determination unit.

13. The inkjet printing apparatus according to claim 12, wherein the threshold value when the print head is in each of the inter-page delay standby mode, the eject cut standby mode, and the user cut standby mode is less than the threshold value when the print head is in the normal standby mode.

14. A method for controlling a print head, wherein the print head includes a plurality of nozzles, each configured to discharge ink onto a print medium, the method comprising:

starting an intra-standby preliminary discharge operation performed by the print head in which a preliminary discharge operation to discharge ink into a cap is performed at predetermined time intervals during a standby period after the print head finishes a printing operation to print an image;

continuing the intra-standby preliminary discharge operation if an accumulated value of an amount of ink stored in a storing unit during the preliminary discharge operation is not greater than a threshold value;

stopping the intra-standby preliminary discharge operation if the stored accumulated value of the amount of ink is greater than the threshold value; and bringing the print head into contact with the cap and terminating the standby period if the standby period exceeds a predetermined time period.

* * * * *